(12) United States Patent  (10) Patent No.: US 7,861,991 B1
Sylvertooth-Jackson  (45) Date of Patent: Jan. 4, 2011

(54) ATTACHMENT MEANS FOR PORTABLE MULTIMEDIA DEVICE

(76) Inventor: Michelle Sylvertooth-Jackson, 61 Willow St., Jersey City, NJ (US) 07305

( * ) Notice: Subject to any disclaimer, the term of this patent is extended or adjusted under 35 U.S.C. 154(b) by 852 days.

(21) Appl. No.: 11/715,621

(22) Filed: Mar. 8, 2007

Related U.S. Application Data

(60) Provisional application No. 60/783,666, filed on Mar. 20, 2006.

(51) Int. Cl.
*E04G 3/00* (2006.01)

(52) U.S. Cl. .................................................. 248/274.1

(58) Field of Classification Search .............. 248/274.1, 248/282.1, 289.11, 917, 921; 280/33.992
See application file for complete search history.

(56) References Cited

U.S. PATENT DOCUMENTS

| | | | |
|---|---|---|---|
| 4,458,870 A * | 7/1984 | Duncan et al. ............ | 248/279.1 |
| 4,756,454 A | 7/1988 | Villanueva et al. | |
| 5,144,898 A * | 9/1992 | Posly ......................... | 108/148 |
| 5,437,061 A | 8/1995 | Kenner | |
| 5,624,156 A | 4/1997 | Leal et al. | |
| 5,816,648 A * | 10/1998 | Baccili et al. ............ | 297/159.1 |
| 6,354,044 B1 | 3/2002 | Lagace, Jr. | |
| 6,764,133 B2 | 7/2004 | Osato | |
| 6,932,377 B2 | 8/2005 | Bretschger et al. | |

\* cited by examiner

*Primary Examiner*—Terrell McKinnon
*Assistant Examiner*—Erin Smith
(74) *Attorney, Agent, or Firm*—Montgomery Patent and Design; Robert C. Montgomery

(57) ABSTRACT

An attachment apparatus for securing a portable multimedia device to an infant stroller or perambulator that is fully adjustable. The apparatus is connected to the stroller's side support arms by frame clamp mechanisms. An adjustable support arm structure, comprised of a telescopic second arm assembly pivotally attached thereto a telescopic first arm assembly, is attached to the frame clamp mechanisms. A tray assembly removably affixed to a latitudinal adjustment plate is releasably attached to an upper portion of said adjustable support arm structure supports and secures the portable multimedia device. A tilting mechanism at the releasable attachment point adjusts the viewing angle, and latitudinal adjustment is accomplished by manually adjusting the tray assembly in an axial direction with respect to the latitudinal adjustment plate via an adjustment knob and guide. When not in use, the entire apparatus can be detached and stowed to the tray assembly via stowing clips.

10 Claims, 7 Drawing Sheets

ATTACHMENT MEANS FOR PORTABLE MULTIMEDIA DEVICE

RELATED APPLICATIONS

The present invention was first described in U.S. Provisional Patent Application No. 60/783,666 filed on Mar. 20, 2006.

FIELD OF THE INVENTION

The present invention relates generally to a unique system and method for viewing a digital video playback or similar multi-media entertainment device, while riding in a stroller, wheelchair, or similar apparatus and, more particularly, to an adjustable platform receiver and holder for a laptop computer with integral screen, a portable digital video device (DVD), and a compact disc player (CD) or other multimedia playback unit that attaches to the stroller, wheelchair, or similar riding apparatus.

BACKGROUND OF THE INVENTION

Computer generated, video (DVD) and audio (CD) portable entertainment systems for motor vehicles have become popular optional features for motor vehicles, especially for family mini-vans and sport utility vehicles. Family mini-vans and sport utility vehicles commonly have both audio and video playback units for entertainment and education while traveling. Likewise, an ever-increasing number of people are traveling on public transportation such as trains, buses and airplanes with laptop computers and devices like an iPod® with pre-recorded material for their personal entertainment. Playing videos and recordings relieves the tedium of extended rides while being confined to a passenger seat.

Pre-recorded media recordings are available in selectable age-appropriate content entertainment and educational materials. People of all ages in most of the industrialized world have become accustomed to the concept of on-demand, trans-portable entertainment selections when traveling. The capability of having on-demand, audio-video playback has even extended to normal daily activities such as walking, jogging, working in an office, while around the home, and for relaxation.

Attempts have been made to temporarily attach some portable audio-visual playback units to infant strollers, wheelchairs, and similar riding conveyances. While portable laptop computers as well as portable all-in-one DVD and CD players exist for personal use, they have been not been adapted for temporary use with strollers or wheelchairs.

Safety is another prime consideration, especially when attaching a portable audio-visual device to entertain young children or individuals confined to wheel chairs. Concerns for safety extend beyond bodily injury caused by either the attachment apparatus or the playback device, to vision impairment that can be caused by viewing a video too closely and with excessive vibration.

Several attempts have been made in the past to provide a stroller that incorporates an attachable entertainment device for children, notably U.S. Pat. No. 5,437,061, issued in the name of Kenner, U.S. Pat. No. 6,932,377, issued in the name of Bretschger et al., U.S. Pat. No. 6,764,133, issued in the name of Osato, U.S. Pat. No. 6,354,044, issued in the name of Lagace, Jr., U.S. Pat. No. 4,756,445 issued in the name of Agee, Sr., and U.S. Pat. No. 5,624,156 issued in the name of Leal et al.

None of the prior art particularly describes a fully adjustable and secure attachment means for a multimedia device to a stroller or similar apparatus. Accordingly, there is a need for a means by which audio and/or video entertainment material can be presented to anyone riding in a chair-like apparatus.

SUMMARY OF THE INVENTION

In view of the foregoing disadvantages inherent in the prior art, it has been observed that there is need for the safe, temporary attachment of portable audio-visual devices onto strollers, wheelchairs, and the like for the entertainment and education of the occupants.

The apparatus described herein and method of use disclosed, solves the problem described above by means of an adjustable attachment arm structure and support tray that will securely support a portable audio-video playback device to a stroller, wheelchair, or the like.

Attachment and detachment of a portable audio-visual playback device is safe, secure, and requires minimal physical effort. The apparatus is capable of adjustably clamping to a side support member on almost any type of stroller. Releasable clamps, adaptable members, and flexible extension arms connect the receiving platform to the stroller or wheelchair. When properly installed, a visual playback unit will be at eye level to the riding occupant at a sufficiently safe distance. There is no height consideration for compact disc music playbacks.

Another object of the present invention provides for a pair of frame clamp mechanisms that provide a radial adjustment for said adjustable support arm structure thereto a cylindrical frame location.

Yet another object of the present invention provides for said support arm structure to further comprise a first support arm attachable to the frame of said stroller, wheelchair, or the like and to a latitudinal plate device, and a second support arm pivotally supported thereto said first support arm.

Still yet another object of the present invention is to provide both said first and second support arms to be telescopically adjustable and secured at a desired position with a slide lock means.

The apparatus, along with the playback unit, can be quickly installed and removed without the use of tools.

Yet another object of the present invention provides for said latitudinal adjustment plate to be releasably attached to said adjustment support arm structure via a release mechanism.

Still yet another object of the present invention provides for a tray assembly that is removably attachable and adjustable in an axial direction thereto said latitudinal adjustment plate.

Another object of the present invention provides for said tray assembly to have a retaining lip and a plurality of straps on an upper surface for retaining and securing a multimedia device thereon.

Yet another object of the present invention provides for a method for stowing said apparatus in an unused state via stowing clips located on a bottom surface of said tray assembly for removably attaching said adjustable support arm structure thereto when in a released state from said latitudinal adjustment plate.

The apparatus can be moved safety out of the way whenever the occupant needs to be attended or whenever the occupant needs to be seated into or removed from the stroller, wheelchair, or other similar conveyance.

While initially envisioned for an infant stroller and secondarily to wheelchairs, the apparatus could be utilized with other child care products such as high chair and carriers. The use of this invention and method of use provides the ability to safely entertain children in a stroller or individuals in wheelchairs with a portable DVD player, laptop computer, CD player, or other multi-media playback unit in a safe and efficient manner.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

Figure 1:
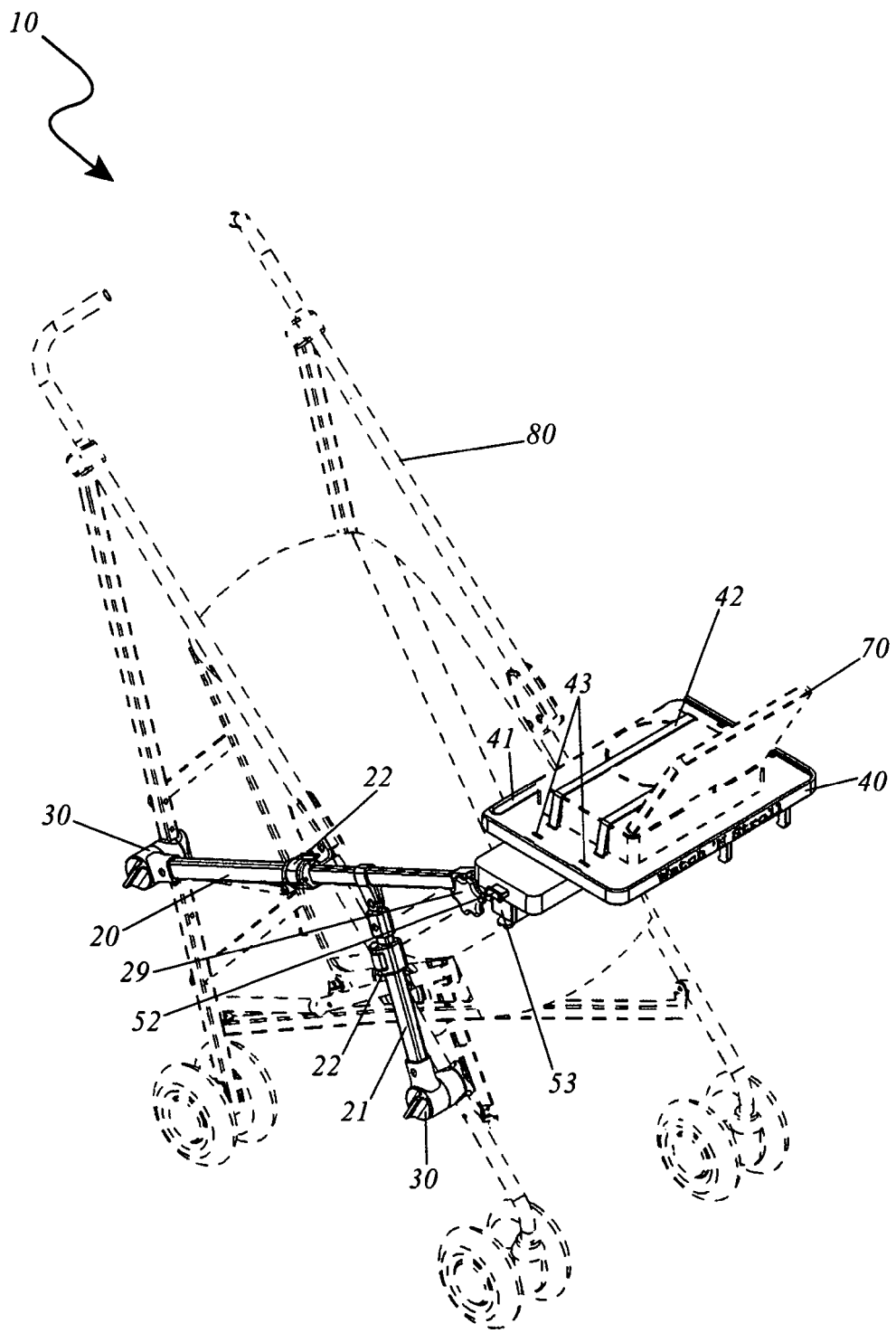
FIG. 1 is an environmental view of an attachment means for a portable multimedia device 10 attached thereto a baby stroller 80, according to the preferred embodiment of the present invention; and, FIG. 2a is a side perspective view of the attachment means for a portable multimedia device 10, according to the preferred embodiment of the present invention; and, FIG. 2b is a close-up view of the strap 42 portion of the attachment means for a portable multimedia device 10, according to the preferred embodiment of the present invention.

DESCRIPTIVE KEY 10 attachment means for a portable multimedia device
20 first support arm
21 second support arm
22 slide lock
23 second outer shaft
24 second inner shaft
25 pivot clamp
26 first outer shaft
27 first inner shaft
28 tilt adjustment
29 tilt knob
30 frame clamp mechanism
31 clamp block
32 clamp liners
33 clamp cap
34 clamp knob
35 arm connector
40 tray assembly
41 tray lip
42 strap
43 tray slots
44 tray
50 release mechanism
51 release spring
52 release button
53 release post
60 latitudinal adjustment plate
61 latitudinal adjustment groove
62 knob
70 multimedia device
80 baby stroller
81 side support member
90 stowing clamps

DETAILED DESCRIPTION OF THE PREFERRED EMBODIMENT

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for attaching a portable multimedia device 70 thereon a baby stroller 80. The attachment means for a portable multimedia device (herein described as the "apparatus") 10 provides a means to mount various multimedia devices 70 in a secure and stabile means for normal viewing by the baby stroller 80 occupant. Furthermore, the apparatus 10 provides a fully adjustable and a removably attachable mounting structure to enable easy stowing during child loading/unloading as well as adjustability of the viewing angles and positions of the multimedia device 70. The apparatus 10 comprises a tray assembly 40, a latitudinal adjustment plate 60, a tray tilt mechanism 28, an adjustable support arm structure 20, 21, a frame clamp mechanism 30, and a release mechanism 50 to remove the tray assembly 40 from the attachment structure. The apparatus 10 is envisioned to be fabricated of durable and lightweight materials, to support the weight of various multimedia devices 70 and to also provide a safe environment for the baby stroller occupant.

Referring now to FIG. 1, an environmental view of the apparatus 10, according to the preferred embodiment of the present invention, is disclosed. Illustrated here is the apparatus 10 installed and specifically configured for a typical baby stroller 80. The apparatus 10 provides a means of attachment to the side support members 81 by two (2) frame clamp mechanisms 30 which will be discussed in detail below (see FIG. 6a).

Referring now to FIG. 2, a side perspective view of the apparatus 10, according to the preferred embodiment of the present invention, is disclosed. The apparatus 10 comprises an attachment system which further comprises a removably attachable first support arm 20, and a removably attachable second support arm 21. The apparatus 10 also comprises a tray assembly 40 which further comprises a tray 44, tray straps 42, tray slots 43, and a tray lip 41. The apparatus 10 also comprises a release mechanism 50 which further comprises a release spring 51, a release button 52, and a release post 53. The release mechanism 50 will be discussed in greater detail below (see FIGS. 4a and 4b). The apparatus 10 also comprises a tilt adjustment 28, a tilt knob 29, a latitudinal adjustment plate 60, a latitudinal adjustment groove 61, and a knob 62. The first support arm 20 comprises a secure and adjustable mechanical connection between the baby stroller and the release mechanism 50 (see FIG. 5). The second support arm 21 comprises a secure and adjustable mechanical connection between the baby stroller 80 and the first support arm 20 (see FIG. 5). The tray 44 is envisioned to be approximately 9"×13" and provides a flat surface comprising a tray lip 41 located around, and molded into, the entire perimeter of the top surface of the tray 40 providing secure retention of the multimedia device. The tray 44 is envisioned to be manufactured using durable and light weight materials such as, but not limited to, hard plastic, aluminum, or the like. The tray straps 42, provide a means of secure attachment of the multimedia device 70 to the tray 40 and are envisioned to be made of materials such as, but are not limited to, a hook-and-loop assembly, elastic strapping, non-elastic strapping, fabric straps with buckles, or the like. The tray slots 43 are envisioned to provide a means to hook to or thread the said straps 42 through the tray 40. The tilt adjustment 28 provides radial adjustment of the multimedia device 70 viewing angle. The tilt adjustment 28 comprises a tilt knob 29. The tilt knob 29 is envisioned to be a common knob with integral threaded stud and is commercially available. The tilt adjustment 28 is envisioned to be constructed of a circular locking device providing a corresponding and interlocking surface with the release post 53. The said circular locking device provides positive radial positioning of the tray assembly 40 and uses features such as, but not limited to, a ball-detent, radial grooves, knurled surfaces, toothed perimeter, or the like. The latitudinal adjustment plate 60 provides a means to adjust the position of the tray assembly 40 (see FIG. 3).

Figures 2A, 2B:
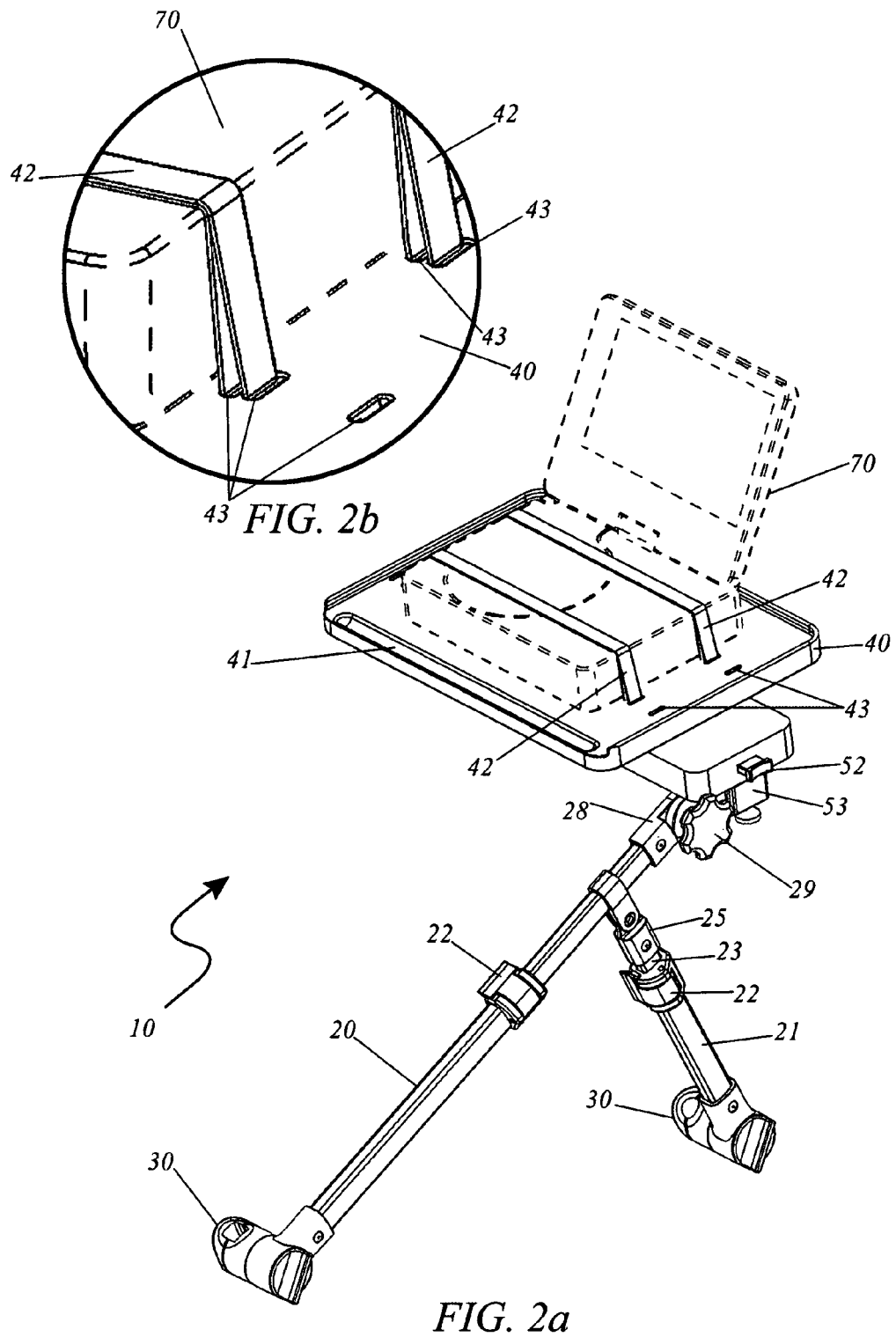

Referring now to FIG. 2b, a close-up view of the strap 42 portion of the apparatus 10, according to the preferred embodiment of the present invention, is disclosed. The tray straps 42, provide a means of secure attachment of the multimedia device 70 to the tray 40 and are envisioned to be made of materials such as, but are not limited to, a hook-and-loop assembly, elastic strapping, non-elastic strapping, fabric straps with buckles, or the like. The tray slots 43 are envisioned to provide a means to hook to or thread the said straps 42 through the tray 40.

Figure 3:
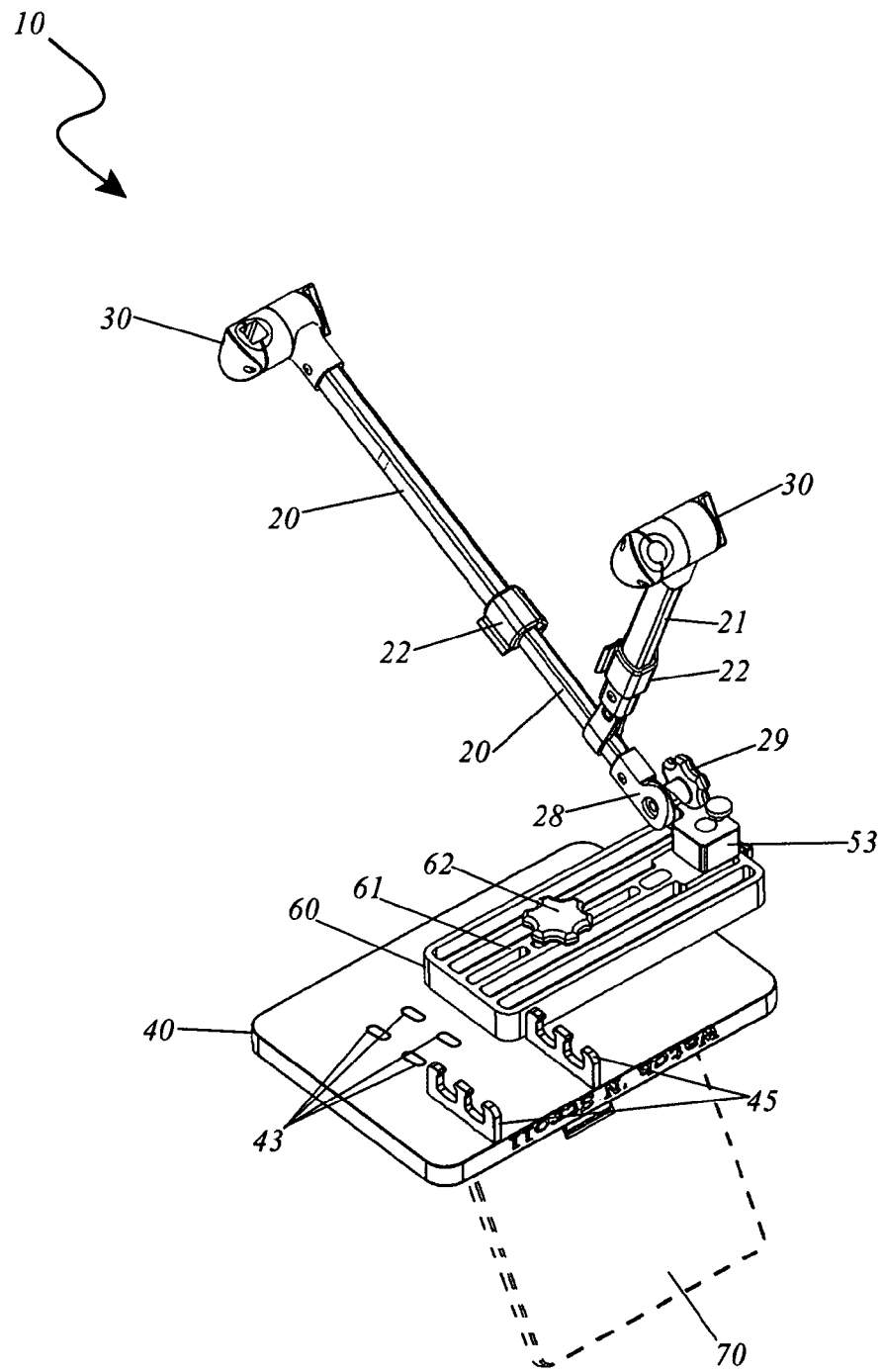
FIG. 3 is a bottom-looking perspective view of the attachment means for a portable multimedia device 10, according to the preferred embodiment of the present invention; and, FIG. 4a is a close-up perspective view of the release mechanism 50 portion of the attachment means for a portable multimedia device 10, according to the preferred embodiment of the present invention.

Referring now to FIG. 3, a bottom-looking perspective view of the apparatus 10, according to the preferred embodiment of the present invention, is disclosed. This view helps to illustrate the latitudinal adjustment plate 60, and the stowing clamps 90. The latitudinal adjustment plate 60 provides adjustment of the tray assembly 40 in a latitudinal direction thereby changing the multimedia device 70 viewing angle. The latitudinal adjustment plate 60 is envisioned to be attached to the tray assembly 40 via a knob 62 and is guided axially in a latitudinal direction by a latitudinal adjustment groove 61 which is envisioned to be molded or formed integrally into the latitudinal adjustment plate 60. The knob 62 is envisioned to be a common knob with an integral threaded stud and is commercially available. The knob 62 is envisioned as being screwed into a threaded insert which is molded integrally into the bottom of the tray 44. The stowing clamps 90 provide a means for stowing the support arms 20, 21. The stowing clamps 90 comprise an interfering and locking fit between said locking grooves and the outside diameter of the outer shafts 23, 26 of the support arms 20, 21. The stowing clamps 90 are envisioned to be molded and form an integral part of the tray 44.

Figures 4A, 4B:
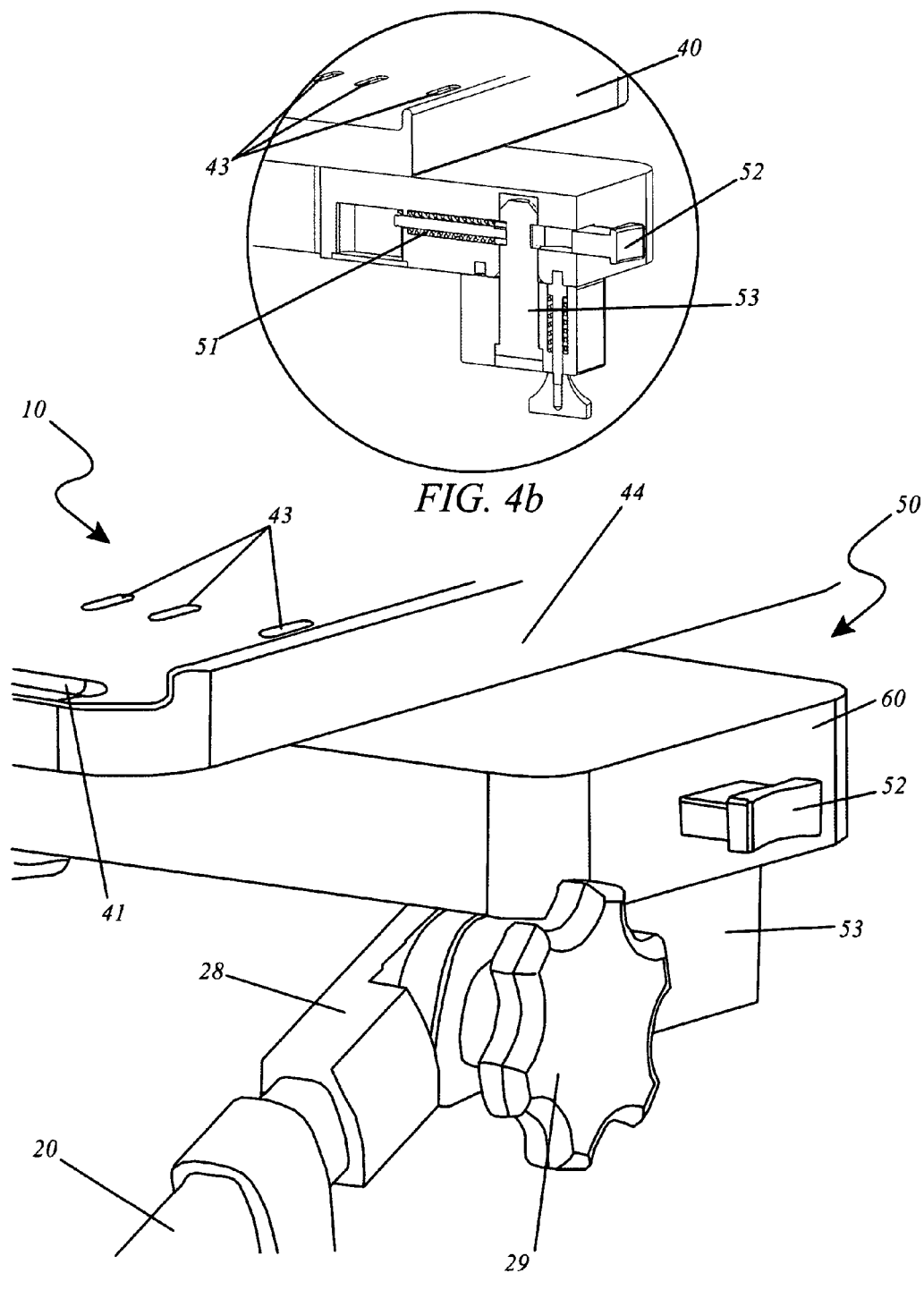
FIG. 4b is a section view of the release mechanism 50 portion of the attachment means for a portable multimedia device 10, according to the preferred embodiment of the present invention.

Referring now to FIG. 4a, a close-up perspective view of the release mechanism 50 element of the apparatus 10, according to the preferred embodiment of the present invention, is disclosed. The apparatus 10 comprises a release mechanism 50, a first support arm 20, a tray 44, a latitudinal adjustment plate 60, a tray tilt mechanism 28, and a knob 29. The release mechanism 50 further comprises a release button 52, a release post 53, and a release spring 51. The release button 52 provides a means to quickly release and remove the tray assembly 40 from the apparatus 10. The release post 53 comprises a circular locking device providing a corresponding and interlocking surface thereto the tilt adjustment 28. The said circular locking device provides positive radial positioning of the tray assembly 40 and uses features such as, but not limited to, a ball-detent device, radial grooves, knurled surfaces, a circular toothed device, or the like.

Referring now to FIG. 4b, a section view of the release mechanism 50 portion of the apparatus 10, according to the preferred embodiment of the present invention, is disclosed. The release button 52 comprises a finger-actuated type which slides in a linear direction in a square hole formed in the latitudinal adjustment plate 60. The release button 52 further comprises a keyhole shaped opening which enables insertion and locking of the release post 53. The release spring 51 provides a static force to the release mechanism 50 thereby maintaining the locked condition during normal use of the apparatus 10. The release mechanism 50 is envisioned to be made of durable and lightweight materials such as, but not limited to, plastic, aluminum, or the like.

Figure 5:
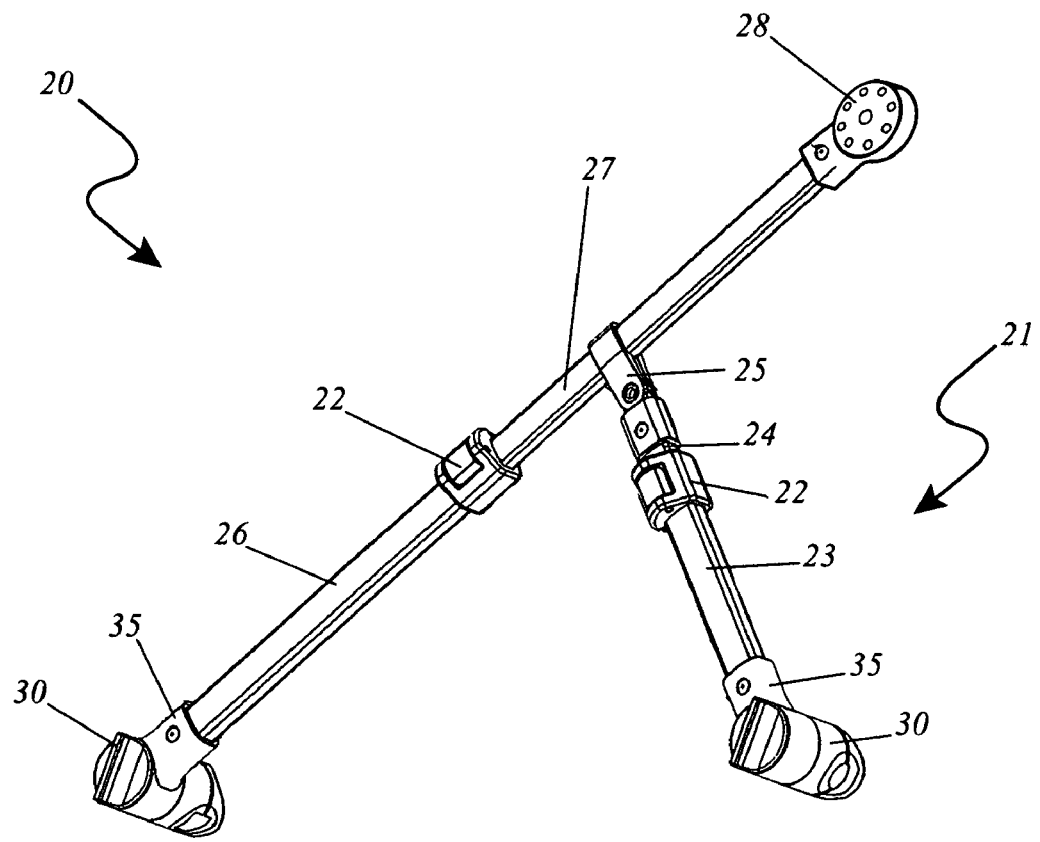
FIG. 5 is close-up perspective view of the support arm 20, according to the preferred embodiment of the present invention; and, FIG. 6a is an exploded view of a frame clamp mechanism 30, according to the preferred embodiment of the present invention; and, FIG. 6b is an assembly view of a frame clamp mechanism 30, according to the preferred embodiment of the present invention; and, FIG. 7, a perspective view of the stowed configuration of the attachment means for a portable multimedia device 10, according to the preferred embodiment of the present invention.

Referring now to FIG. 5, a close-up of the support arm 20, 21 portion of the apparatus according to the preferred embodiment of the present invention, is disclosed. The support arm portion 20, 21 of the apparatus 10 comprises a first support arm assembly 20 and a second support arm assembly 21 thereby providing a secure connection at two (2) locations on the baby stroller 80.

The first support arm 20 provides a removably attachable means of securing the apparatus 10 to the rear portion of the baby stroller 80. The first support arm 20 further a tilt adjustment 28, a knob 29, an inner shaft 27, an outer shaft 26, a pivot clamp 25, a slide lock 22, and an arm connector 35. The first support arm 20 is envisioned to be made of durable and lightweight materials such as plastic, aluminum, or the like. The tilt adjustment 28 provides a means to adjust the viewing angle of the multimedia device 70. The tilt adjustment 28 further comprises a tilt knob 29. The tilt knob 29 is envisioned to be a common knob with an integral threaded stud and is commercially available. The tilt adjustment 28 is envisioned to be constructed of a circular locking device providing a corresponding and interlocking surface with the release post 53. The said circular locking device provides positive radial positioning of the tray assembly 40 and uses features such as, but not limited to, a ball-detent device, radial grooves, knurled surfaces, a circular toothed device, or the like. The pivot clamp 25 provides a means of solid attachment and radial adjustment to the second support arm 21. The inner shaft 27 and outer shaft 26 provide a means to position the apparatus 10 in a variety of configurations based upon the particular baby stroller 80 design. The inner shaft 27 is envisioned to slide within the outer shaft 26 in a telescoping manner and is held in relative position via a slide lock 22. The slide lock 22 is constructed using a common tubular slide lock device found on many photographic tripods. The first outer shaft 26 provides a means of attachment to the frame clamp mechanism 30 via an arm connector 35. The first outer shaft 26 is envisioned to be attached to the arm connector 35 using fastening devices such as, but not limited to screws, rivets, adhesives, or the like. The frame clamp mechanism 30 will be discussed in greater detail below (see FIGS. 6a and 6b).

The second support arm 21 provides a removably attachable means of securing the apparatus 10 to the lower portion of the baby stroller 80. The second support arm 21 comprises an inner shaft 24, an outer shaft 23, a pivot clamp 25, a slide lock 22, and an arm connector 35. The pivot clamp 25 provides a means of radial attachment to the first support arm 20. The inner shaft 24 and outer shaft 23 provide a means to position the apparatus 10 in a variety of configurations based upon the particular baby stroller 80 design. The inner shaft 24 is envisioned to slide within the outer shaft 23 in a telescoping manner and is held in relative position via a slide lock 22. The slide lock 22 is constructed using a common tubular slide lock device found on many photographic tripods. The second outer shaft 23 provides a means of attachment to the frame clamp mechanism 30 via an arm connector 35. The second outer shaft 23 is envisioned to be attached to the arm connector 35 using fastening devices such as, but not limited to screws, rivets, adhesives, or the like. The frame clamp mechanism 30 will be discussed in greater detail below (see FIGS. 7A and 7B).

Figure 6A:
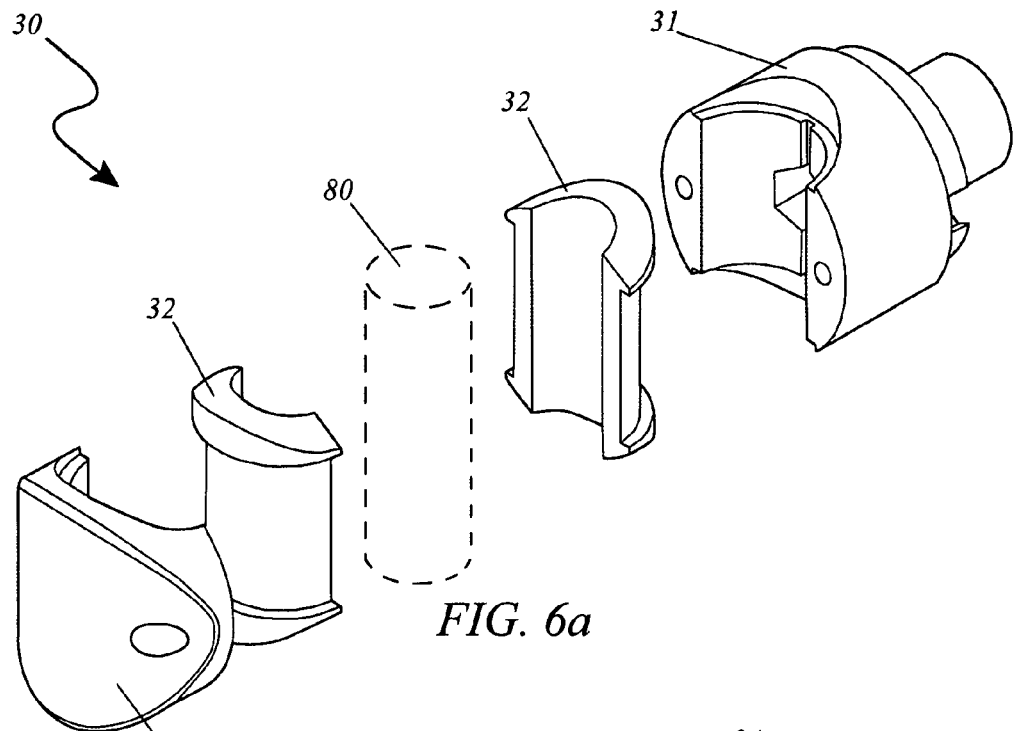
Figure 6B:
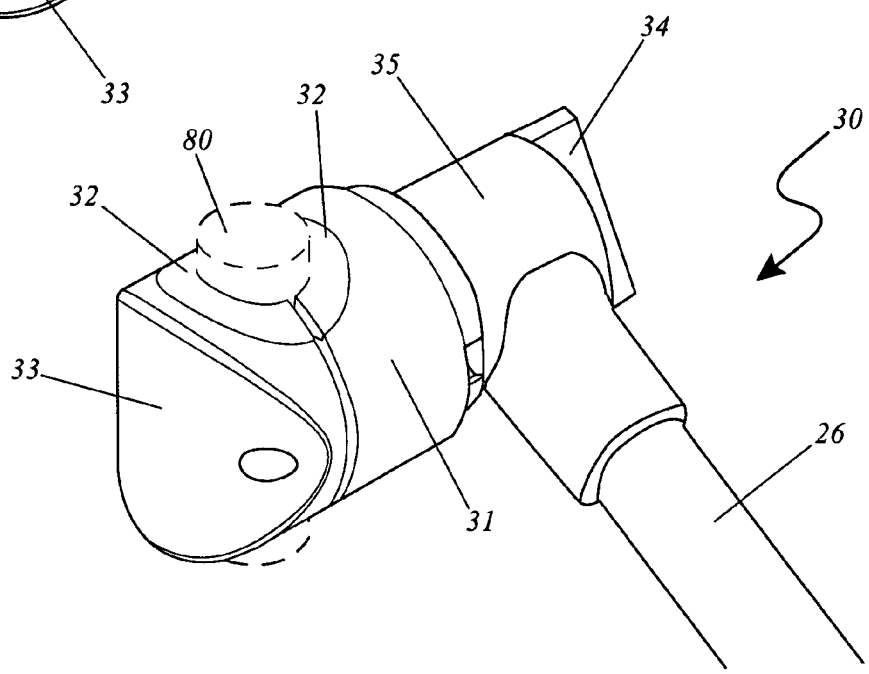

Referring now to FIG. 6a, an exploded view and FIG. 6b an assembly view of a frame clamp mechanism 30, according to the preferred embodiment of the present invention, is disclosed. The frame clamp mechanism 30 is envisioned to be removably attachable, and vertically and radially adjustable along the side support member 81 of the baby stroller 80. The frame clamp mechanism 30 also provides a means of radial adjustment to the support arms 20, 21. The frame clamp mechanism 30 comprises a clamp knob 34, an arm connector 35, a clamp block 31, clamp liners 32, and a clamp cap 33. The clamp knob 34 provides a means to manually loosen and adjust the elements of the frame clamp mechanism 30. The clamp knob 34 is envisioned to be a common knob with an integral threaded stud and is commercially available. The arm connector 35 provides an adjustable means to connect the support arms 20, 21 to the frame clamp mechanism 30. The arm connector 35 is envisioned to be connected to the outer shafts 23, 26 using attachment means such as, but not limited to, bolts, rivets, screws, or the like. The arm connector 35 is envisioned to be constructed of a circular locking device providing corresponding and interlocking surfaces. The said circular locking device provides positive radial positioning of the support arms 20, 21 and uses features such as, but not limited to, a ball-detent device, radial grooves, knurled surfaces, a circular toothed device, or the like. The clamp block 31, the clamp liners 32, and the clamp cap 33 together provide an attachment means to the side support member 81 using a 4-part clamp assembly with interchangeable clamp liners 32. The clamp liners 32 are envisioned to be provided as an accessory to the apparatus 10 comprising a variety of internal geometries that conform to various side support member 81 profiles. The clamp cap 33 is further envisioned to be attached to the clamp block 31 with fasteners such as bolts, screws, and the like. The frame clamp mechanism is envisioned to be made from durable and lightweight materials such as plastic, aluminum, or the like.

Figure 7:
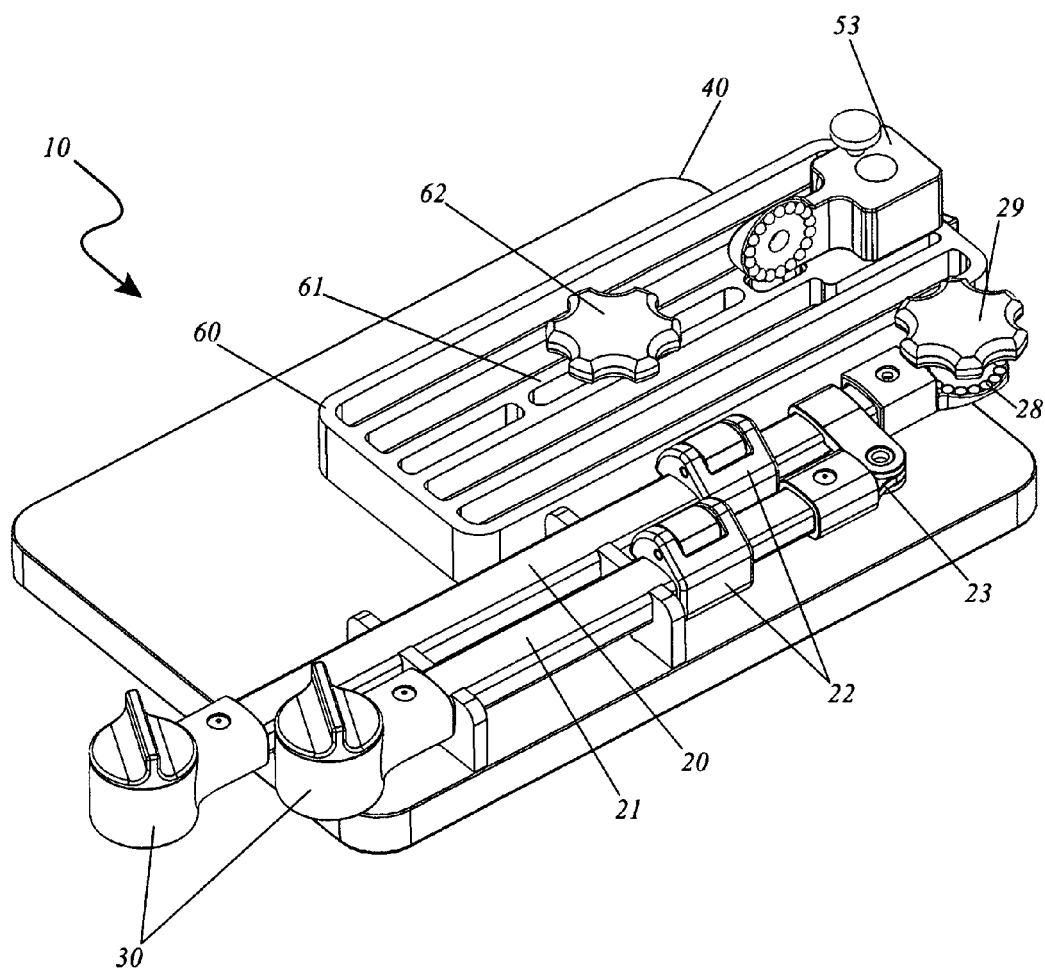

Referring now to FIG. 7, a perspective view of the stowed configuration of the apparatus 10, according to the preferred embodiment of the present invention, is disclosed. The apparatus 10 comprises stowing clamps 90, Support arms 20, 21, a tray 40, a latitudinal adjustment plate 60, and a release post 53. The stowing clamps 90 comprise two (2) locking grooves providing a means for stowing the support arms 20, 21. The stowing clamps 90 further comprise molded features that provide an interfering and locking fit between said locking grooves and the outside diameter of the outer shafts 23, 26. The stowing clamps 90 are envisioned to be molded and formed integrally to the tray 44.

It is envisioned that other styles and configurations of the present invention can be easily incorporated into the teachings of the present invention, and only one particular configuration shall be shown and described for purposes of clarity and disclosure and not by way of limitation of scope. The preferred embodiment of the present invention can be utilized by the common user in a simple and effortless manner with little or no training. After initial purchase or acquisition of the apparatus 10, it would be installed as indicated in FIG. 1

The method of utilizing the device may be achieved by performing the following steps: selecting two (2) side support members 81 to attach the apparatus 10 thereto; attaching the clamp block 31, the clamp liners 32, and the clamp cap 33 onto the side support member 81 using the fasteners provided with the apparatus 10; pre-assembling the two (2) support arms 20, 21 to the release post 53; attaching the pre-assembled support arms 20, 21 to the frame clamp mechanisms 30 via the arm connector 35 and the clamp knob 34; adjusting the position of the support arms 20, 21 into an approximate final location by manipulation of the frame clamp mechanisms 30, the slide locks 22, and the pivot clamp 25; tightening the frame clamp mechanisms 30, and the slide locks 22 temporarily; pre-assembling the tray assembly 40 and the latitudinal adjustment plate 60; installing the tray assembly 40 and latitudinal adjustment plate 60 pre-assembly to the release post 53 via the release button 52; making final adjustments to the position of the apparatus 10 by further manipulation of said adjustment means; installing the multimedia device 70 and the straps 42 securely to the apparatus 10; activating and viewing the multimedia device 70 by the baby stroller 80 occupant.

The stowing of the apparatus 10 can be appreciated by performing the following steps: removing the tray assembly 40 portion of the apparatus 10 by depressing the release button 52 and lifting the said tray assembly 40 from the apparatus 10.

A more complete stowage method for the apparatus 10 can be realized by performing the following steps; removing the support arms 20, 21 at the frame clamp mechanisms 30 via the clamp knobs 34; detaching the tray assembly 40 at the tilt adjustment 28 via the tilt knob 29; attaching the support arms 20, 21 to the underside of the tray assembly 40 via the stowing clamps 90.

It will also be appreciated that the apparatus 10 may be installed, with little use of tools or modification, thereby minimizing the number of parts required and hence reducing manufacturing and distribution costs. It will also be appreciated by those skilled in the art that while this invention has been described with particular reference to attachment to a baby stroller 80, the present invention is not limited thereto, as the tray assembly 40 of this invention can be equally well attached to a frame member of buggies, carriages, luggage, high chairs, and other movable or immovable devices. Although a side support member 81 of a round profile was envisioned for a frame clamp mechanism 30, other profiles of a plurality of designs are envisioned permitting the affixing of the apparatus 10 onto a plurality of side support members 81 of different profiles and designs.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An adjustable receiver and holder apparatus for a portable multimedia device that is removably attachable to an occupant supporting device, said apparatus further comprises:
    an adjustable support arm structure removably attachable to said occupant supporting device at a proximal end with a first and a second frame clamp mechanism, wherein said frame mechanisms provide a vertical and a radial adjustment means, further comprising:
        a first support arm removably attachable to a latitudinal adjustment plate at a first upper end and further comprising:
            a first inner shaft slidably adjustable within a first outer shaft to provide a first desired position;
            a first slide lock for securing said first desired position;
            a tilt mechanism connector removably attachable to said first upper end;
            a first arm connector, comprised of a circular locking device providing corresponding and interlocking surfaces, located at a first lower end of said first outer shaft for removably attaching said adjustable arm support structure to said first frame clamp mechanism via fasteners; and,
            a pivot clamp located on an intermediary position about said first outer shaft:
        a second support arm removably attachable and radially adjustable to said first support arm via said pivot clamp at a second upper end and further comprising:
            a second inner shaft slidably adjustable within a second outer shaft to provide a second desired position;
            a second slide lock for securing said second desired position; and,
            a second arm connector, comprised of a circular locking device providing corresponding and interlocking surfaces, located at a second lower end of said second outer shaft for removably attaching said adjustable arm support structure to said second frame clamp mechanism via fasteners;
        said latitudinal adjustment plate releasably attachable to a distal end of said adjustable support arm structure and further comprising a tilting adjustment means; and,
        a tray assembly attachable and latitudinally adjustable to said latitudinal adjustment plate and comprising a means to removably and securely affix said multimedia device thereto;
    wherein said apparatus comprises an article of manufacture of durable and lightweight materials in order to support the weight of various multimedia devices and to also provide a safe environment for an occupant of said occupant supporting device; and,
    wherein said first and second frame clamp mechanisms comprise a means of radial adjustment with said first and second support arms, respectively, each further comprising:
        a pair of opposing and interchangeable clamp liners conforming to a cylindrical frame component of said occupant supporting device;
        a clamp block and a clamp cap threadably affixed to each other and encompassing said clamp liners, wherein said clamp block engages said first or said second arm connector; and,
        a clamp knob threadably attached to said clamp block within said arm connector to provide a means to manually loosen and adjust said first or second frame clamp mechanism to said first or second support arm;
        wherein said first frame clamp mechanism is removably attachable and radially and vertically adjustable to a first frame location and said second frame clamp mechanism is removably attachable and radially and vertically adjustable to a second frame location of said occupant supporting device.

2. The apparatus of claim 1, wherein said latitudinal adjustment plate is a generally rectangular plate and comprises:
    a release mechanism for providing a means to quickly release and remove said latitudinal adjustment and said tray assembly from said apparatus, further comprising:
        a release post;
        a release button, comprising a finger-actuated type button which slides in a linear direction within a square hole formed in a side of said latitudinal adjustment plate and a opening which enables insertion in and locking of said release post; and,
        a release spring, providing a static force for said release mechanism, thereby maintaining a locked condition during normal use of said apparatus;
    a tilting adjustment means for providing positive radial positioning of said latitudinal adjustment plate and said tray assembly to a desired viewing angle for said multimedia device, wherein said tilt mechanism connector provides a corresponding and interlocking surface to said release post and manually adjusted by a tilt knob; and,
    a latitudinal adjustment groove located in a central location, thereby guiding said tray assembly in an axial direction.

3. The apparatus of claim 2, wherein said tray assembly is generally a rectangular shape and further comprises:
    a lower portion, comprising:
        a latitudinal adjustment knob, threadably secured within an insert in a bottom surface of said tray assembly for axially guiding said tray assembly in a latitudinal direction through said latitudinal adjustment groove to a desired latitudinal position; and,
        a pair of stowing clamps comprised of opposing locking grooves and molded to form an integral part of said tray assembly for providing a stowing means for stowing both said first and second support arms, thereby comprising an interfering and locking fit between said locking grooves and an outside diameter of said first and second outer shafts of said first and second support arms, respectively; and,
    an upper portion, comprising a tray lip located about an entire perimeter of an upper surface of said tray assembly;

a plurality of tray slots formed through the tray assembly; and, a plurality of tray straps routed through said tray slots and providing a removable secure attachment means for said multimedia device thereto said tray assembly.

4. The apparatus of claim 3, wherein said tray straps comprise one of the following types: hook-and-loop strapping, elastic strapping, non-elastic strapping, or fabric straps with buckles.

5. The apparatus of claim 4, wherein said first and second support arms are free of protrusions and sharp edges thereby providing ample safety to said occupant.

6. The apparatus of claim 5, wherein said slide lock is constructed using a tubular slide lock device.

7. The apparatus of claim 6, wherein said circular locking device comprising said first and second arm connector and said tilt mechanism connector utilizes features comprised of one or more of the following list: a ball-detent, radial grooves, knurled surfaces, or a toothed perimeter.

8. The apparatus of claim 7, wherein said tray assembly comprises dimensions of 9"×13".

9. The apparatus of claim 8, wherein said apparatus is manufactured out of a plastic construction.

10. The apparatus of claim 8, wherein said apparatus is manufactured out of an aluminum construction.

\* \* \* \* \*